May 4, 1965 R. E. FRUIN ETAL 3,182,293

CRYOGENIC MEMORY CIRCUIT

Filed April 18, 1962 2 Sheets-Sheet 1

Inventors:
Robert E. Fruin;
Vernon L. Newhouse,
by John P. Dellitt
Their Attorney.

Inventors:
Robert E. Fruin;
Vernon L. Newhouse,
by John P. Dellitt
Their Attorney.

United States Patent Office 3,182,293

Patented May 4, 1965

3,182,293

CRYOGENIC MEMORY CIRCUIT

Robert E. Fruin, Schenectady, and Vernon L. Newhouse, Scotia, N.Y., assignors to General Electric Company, a corporation of New York Filed Apr. 18, 1962, Ser. No. 188,328
6 Claims. (Cl. 340—173.1)

Figure 1:
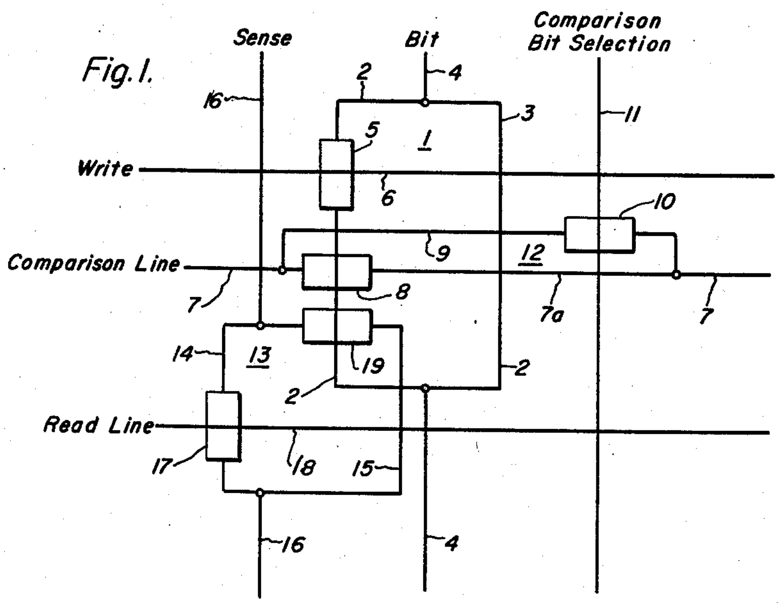

This invention relates to crygenic memory apparatus and more particularly to a combined circuit for accomplishing the multiple purposes of comparison and readout and which allows broad component tolerances.

Cryogenic or superconducting memories are known which comprise a multiplicity of persistent current loops or cells established in an array of columns and rows. A binary "one" can be stored as a clockwise persisting current in the memory loop, a zero then being stored as a counter-clockwise persisting current. Separate rows are provided for separate "words" stored in the memory while the columns represent the separate "digit" positions common to all words. Column conductors interconnect the various persistent current loops or cells through which the contents of the memory cells are entered in coincidence with a "write" current on a "write" line running along a selected row. The memory cells plus interconnecting leads are conveniently deposited as thin film conductors on a common insulating base or substrate.

In addition to storage features, a cryogenic memory desirably has the property of multiple simultaneous comparison of an "interrogation" word, or part thereof, with the entire contents of the memory. Such a memory, termed a data addressed memory, is described and claimed in the copending application of Pierre H. Boucheron, Jr., Serial Number 127,459, filed July 25, 1961, and assigned to the assignee of the present invention. Each row "word" of such a memory may, for example, contain the stock number, description, quantity and location of a separate inventory item. The entire memory can then be simultaneously interrogated on the basis of item description, whereupon the rest of the information in the row is substantially instantaneously reproduced or "read out."

In the foregoing type of data addressed memory, additional functions must be accomplished in addition to storage of digits at the locations of various memory cells. One function is the aforesaid comparison of all the memory rows with an interrogation. Another function, of course, is the reading out of the digits of a comparing "word," preferably in a parallel or simultaneous manner. One or more additional column or row conductors are ordinarily required for each of these functions. The first of the foregoing functions are accomplished in the apparatus described in the application of Pierre H. Boucheron, Jr., by means of a comparison line extending along each row of the memory and including a "cryotron" underlying each persistent current memory loop or cell in the row. A current on a comparison line indicates a favorable comparison with the interrogation. The simultaneous reading function is similarly provided by a number of read lines extending along the memory columns, each such read line including a cryotron underlying each persistent current memory cell in the column. The read lines are activated simultaneously to "read out" the contents of a particular row in the memory. Each read line delivers a separate digit of the desired word.

Comparing and reading out in this manner requires the comparison and read out cryotrons to distinguish between the "zero" and "one" digit currents usually stored in the memory cells, and larger currents which are caused to occur in these cells (by means of column conductor currents) during comparison and read out. In the example memory referred to, the cryotrons must distinguish between a current of I and I/2. Tolerances in layout, fabrication, cryotron characteristics and operating temperature have to be rather tightly controlled to hold the comparison ratio to the theoretical 2/1. It is more desirable to provide cryogenic memory circuitry which does not require tight tolerances, i.e. wherein a cryotron need only distinguish between the presence of a current on the one hand, and substantially zero current on the other. It is frequently useful, therefore, to provide by-pass branches forming a "loop" with each read or compare cryotron. The by-pass branches are controlled to by-pass the cryotrons associated with cells not being interrogated, or not being read as the case may be, so these cryotrons are not called upon to remain superconducting.

In the instance of a cell whose state is to be interrogated, the by-pass is "inhibited" coincidentally with the presence of a digit interrogation current in the column conductor, which current increases the total current over the compare cryotron to full value, or decreases it to zero. The cryotrons in the comparison line which cross cells not being interrogated are by-passed with a non-inhibited by-pass branch and are therefore not called upon to pass current despite the presence of a persistent current in the cell they cross. A compare cryotron is thus called upon only to distinguish between maximum and substantially zero cell current. Similarly, read cryotrons in the read lines are by-passed except for read cryotrons in the particular row which is to be read out.

These extra by-pass loops, although useful, involve additional space when disposed upon the memory substrate. Moreover, additional conductors are required for each loop, i.e., a current supply line for each loop and a line for inhibiting the by-pass portion of each loop.

In accordance with an aspect of the present invention the functions of two additional loops are accomplished with a single additional loop. This loop then acts both to detect comparisons and to read the contents of a memory cell. One current supply line extending across the array, which would be necessary in the case of an additional loop is also thereby eliminated.

In accordance with a particular embodiment of the present invention, a single additional superconducting loop is included at each memory location. This loop comprises two superconducting branches connected in parallel with each other and in series with a comparison line extending to other similar memory locations. The additional loop is disposed in cryotron relation with the primary or memory cell loop so that a current in a first side of the memory cell loop renders resistive a first branch of the additional loop. Likewise, current in the second side of the memory cell loop renders resistive the second branch of the additional loop. A current detection means ascertains which branch remains superconducting and therefore indicates the digit stored at this location.

The same additional loop is used for comparing an "interrogation" with the contents of the primary memory cell or loop. The first branch of the additional loop is looked upon as the "comparison" branch and the second branch may be considered a by-pass. The by-pass branch is selectively inhibited, that is rendered resistive with a cryotron grid means, for a memory location selected to be compared. The only remaining branch, the comparison branch, remains superconducting only if the interrogation and the contents of the memory cell are the same, but becomes resistive in the case of a mismatch. Such a mismatch then forces superconducting current out of the comparison line for the memory row wherein the non-agreeing memory cell is situated because of the absence of a by-pass. The by-pass branch remains active for locations in that row which are not interrogated while a "zero" interrogation is applied thereto. A superconducting current will then flow in one branch or the other at the non-selected locations, and no cryotron will be called upon to determine between gradations of current.

It is thus clear that a single additional loop serves two functions. In the case of comparison, the comparison current is forced to flow in the comparison branch of the additional loop, or not at all, to indicate comparison or lack of comparison. For reading out, the read cryotron determines which branch carries current and therefore, indirectly, the contents of the memory cell.

Although "digits" in a binary system are discussed herein for illustrative purposes, it is understood the devices herein discussed are multistate circuits capable of storing and comparing information coded otherwise.

A principal object of the present invention is to provide an improved cryogenic memory circuit effective to accomplish comparison and read out functions in memory cell locations while minimizing restrictive tolerances.

It is another object of the present invention to provide an improved cryogenic memory circuit wherein simplified and combined circuitry accomplish comparison and read out functions at memory cell locations.

Figure 3:
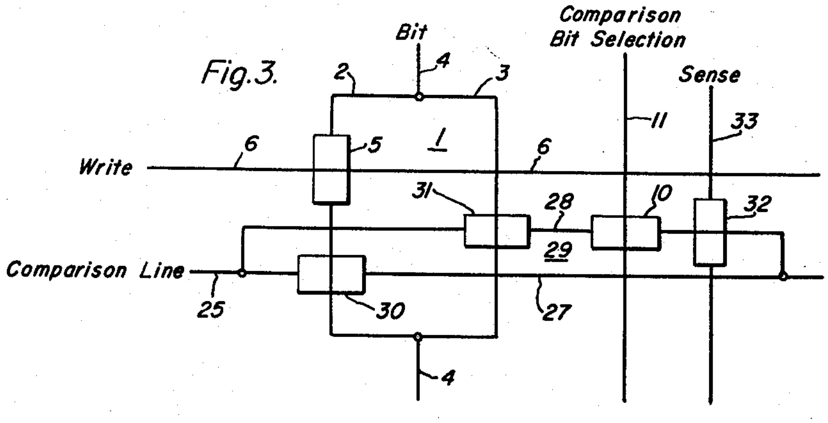
Figure 2:
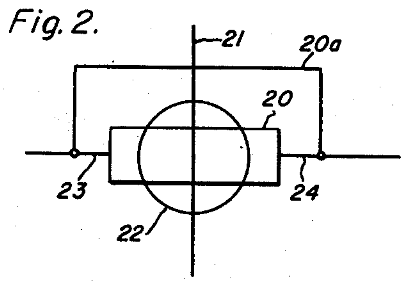
Figure 4:
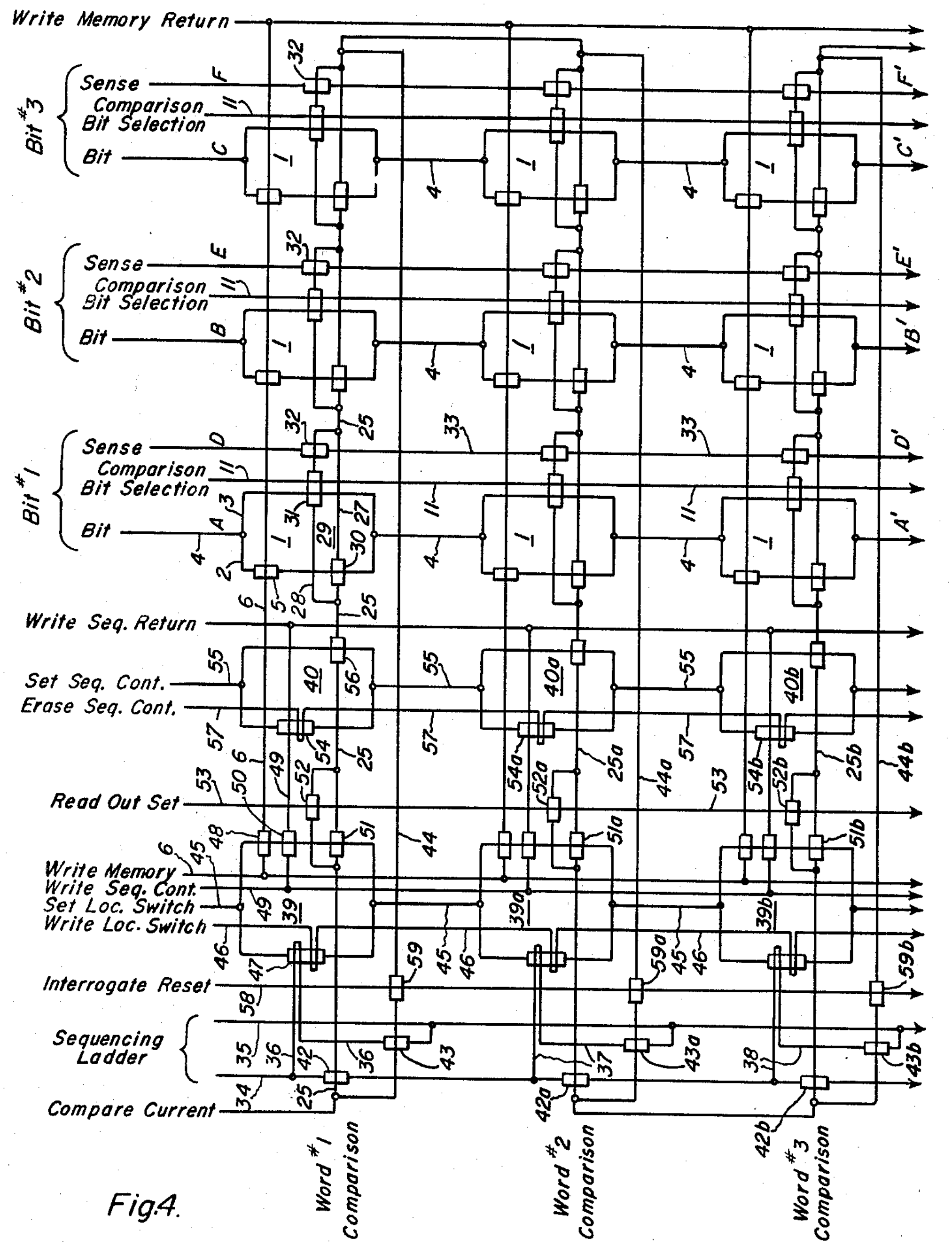

The subject matter which we regard as our invention is particularly pointed out and distinctly claimed in the concluding portion of this specification. The invention, however, both as to organization and method of operation, together with further objects and advantages thereof, may best be understood by reference to the following description taken in connection with the accompanying drawings wherein like reference characters refer to like elements and in which:

FIG. 1 is a schematic diagram of a cryogenic memory cell location with associated comparison and reading means, FIG. 2 is a schematic representation of a cryotron switching device, FIG. 3 is a schematic diagram of a cryogenic memory location comprising combined comparison and reading means in accordance with the present invention, and FIG. 4 is a schematic diagram of a cryogenic memory matrix of the data addressed type.

FIG. 1 illustrates a cryogenic memory cell location with comparison and read by-pass loops as employed for the purpose of broadening required circuit tolerances. In this circuit all conductors shown are superconducting at the temperature of operation, conventionally a few degrees above absolute zero. The memory cell or loop 1 consisting of side conductors 2 and 3, disposed in parallel, stores a binary "one" as a circulating persistent current in a clockwise direction and a binary "zero" as a circulating current in a counterclockwise direction. The sides of the persistent current cell are shunted across one another and are inserted in series with column conductor 4. Side 2 includes a cryotron gate 5 across which is extended "write" line 6 in grid relation to the gate 5 so that a predetermined current in the grid effects the onset of resistance in the gate 5. A comparison line 7 includes a "compare" cryotron gate 8 which is crossed in cryotron grid relation by side conductor 2.

A comparison by-pass line 9 is connected around gate 8 so a comparison line current may alternatively flow in by-pass line 9 in case gate 8 becomes resistive. By-pass line 9 serially includes a cryotron gate 10 crossed by comparison bit selection conductor 11, a current in the latter being effective to inhibit current flow in by-pass line 9. A second loop circuit 12 is thereby formed including comparison line 7 and by-pass line 9 having a first branch *7a* and having line 9 and gate 10 as a second branch.

A third loop 13, employed for the purpose of reading the binary digit in the memory cell location, is formed of a first branch 14 and a second branch 15 shunted across one another and serially included in sense line 16. Branch 14 has connected therein a cryotron gate 17 across which is disposed read line 18 in cryotron grid relation thereto. Branch 15 includes "sense" cryotron gate 19, side 2 of memory cell 1 being disposed thereacross in cryotron grid relation. The read loop 13 is then the second loop in addition to the memory storage cell which is accommodated at this particular memory location employed for purposes of operating the memory.

Before considering the operation of FIG. 1 circuit in detail, the operating mode of the individual cryotron switch element should be considered. Such a cryotron is schematically illustrated in FIG. 2 and comprises a cryotron gate 20 across which is disposed cryotron grid 21. The grid is very narrow with respect to the gate and is insulated therefrom by an intermediate layer of insulation 22. All conductors are superconducting at the temperature of operation so that, in the absence of other factors, they exhibit no electrical resistance. Gate 20 then normally functions to carry a current between end conductors 23 and 24 without presenting resistance to this current. However, a predetermined current in grid conductor 21 is capable of causing the return of resistance in the underlying gate 20 through the medium of the intense magnetic field generated close to the very narrow grid conductor 21. The magnetic field renders resistive the superconducting material forming gate 20 and the current theretofore carried by gate 20 is thereby forced into another superconducting path 20*a* disposed in parallel with gate 20.

Grid 21 is generally formed of a "hard" superconductor for example, lead, and gate 20 is generally formed of a "soft" superconductor, for example, tin. In the specific embodiments shown, the superconducting cryotron gate was formed as a tin film 1600 microns in width and 0.3 micron thick. Across this superconducting cryotron gate was deposited a layer of silicon monoxide insulation 0.8 micron thick. Grid conductor 21, disposed across the insulating layer and in close proximity to the underlying gate, was formed as a layer of lead 55 microns wide and one micron thick. The whole cryotron is conveniently vacuum deposited on a lead shield plane base, or a base of some other suitable superconductor, entirely insulated from the cryotron by a thin layer of silicon monoxide.

In the light of the function of the individual cryotron, the operation of the FIG. 1 circuit will now be described. The circuit of FIG. 1 acts to store information in memory cell or loop 1 which information may be read out by means of loop 13 and which may be compared with other information presented thereacross on column conductor 4. Presence or absence of a comparison is then detected by means of comparison loop 12.

A bit of information is initially entered into loop 1 by presenting a downwards current in column conductor 4 for entering a binary one and an upwards current for entering a binary zero. For example, in the case of a binary one, a downwards current is passed through conductor 4 which divides between side conductors 2 and 3 of loop 1. Write line 6 is then pulsed rendering gate 5 resistive and forcing the column conductor current into the other side conductor 3. The pulse on write line 6 is then concluded after which the column conductor current is concluded. A reaction voltage occurs in side conductor 3 forcing an upwards current in side conductor 2. The two currents combine to provide a continuous clockwise and persisting current around the loop. The persisting current will flow almost indefinitely. This current will, however, be less than the column conductor current applied since the circulating current arose through the reaction of the current in side 3 with the inductance on this side of the loop. When current is forced upwards on the other side, a comparable reactance is encountered. The circulating current is on the order of one half the original current presented on the column conductor.

An interrogation bit of information may now be presented to the memory cell to determine similarity or lack of similarity between the interrogation bit and the information stored in the cell. Suppose then another binary one current is caused to flow in a downwards direction in column conductor 4. This current will divide and add to the clockwise current in side 3 and will subtract from the clockwise current in side 2. Concurrently with the interrogation current in column conductor 4, a comparison bit selection current is applied on conductor 11, "shutting off" cryotron gate 10. Any current flowing in comparison line 7 then must flow in "compare" cryotron 8. Since the interrogation current is subtracted from the clockwise persistent current in side 2 of loop 1, gate 8 remains superconducting and therefore a comparison current may flow in line 7 indicating that both the interrogation bit and the stored bit were the same. A difference in these two would have produced twice the stored current over cryotron gate 8 preventing the resistanceless flow of a supercurrent in line 7.

Should it now be desired to read the contents of loop 1, an additional current will once more be applied to column conductor 4. Either an upwards or a downwards current can be used depending upon the convention followed. Assume for example an upwards current is applied on column conductor 4. This current will divide and add to the stored current in side 2 and will render resistive cryotron gate 19 which side 2 crosses. Simultaneously a current is applied on the read line rendering by-pass cryotron gate 17 resistive. A sense current applied on line 16 will detect resistance, being indicative in this case of a binary one stored in loop 1. If a zero had been stored in loop 1, as a counterclockwise current, gate 19 would have been resistanceless to indicate the binary zero.

The memory location circuit shown in FIG. 1 is duplicated for each bit location of a cryogenic memory matrix of the general type illustrated in FIG. 4 (which as shown employs a different and improved memory location circuit). A comparison line 7 as well as write and read lines are then common to a number of horizontal row memory locations in the matrix and a sense line 16, as well as sense and column conductors, would be common to column memory locations in the matrix. In the instance of a reading operation, an individual memory location would be selected by the coordinate coincidence of sense current on a line 16 and a read current on a line 18 of the FIG. 1 location circuit. Other read loops connected in the same sense line produce no ambiguity as to the cell being read. This is because other read cryotron gates 19 in the other memory locations in a column are by-passed by a superconducting, that is resistanceless, branch 14. Therefore the other cryotron gates 19 in the same column will not be called upon to remain superconducting in the presence of a persistent current in the memory cell. In like manner, all comparison cryotrons will be by-passed by a by-pass branch 9 for memory locations where no interrogation is desired. Cryotron gates 8 associated with non-interrogated memory locations will not be called upon to remain superconducting in the presence of circulating current in memory loop 1.

Although the memory location circuit of FIG. 1 has the advantage of liberal tolerances as regards cryotron characteristics and the like inasmuch as the sense cryotron and the compare cryotron need only distinguish between the presence and absence of grid current, it is noted the FIG. 1 circuit involves a relatively complex arrangement including two loops in addition to the primary memory cell or loop.

In accordance with a principal aspect of the present invention, the advantages of non-stringent cryotron tolerances are retained in a more compact circuit involving only one loop in addition to the memory cell and involving one less matrix conductor extending between the cells. In accordance with this embodiment the same loop is used for both reading and comparison functions.

Referring to FIG. 3, illustrating an embodiment of the present invention, the memory loop or cell 11 comprises a side 2, and a side 3 connected across side 2, the two being disposed in series with column conductor 4. A crytron gate 5 serially included in side 2 has extended thereacross, in cryotron grid fashion, a write line 6.

Comparison line 25 connects to first and second branches 27 and 28, respectively, of a second loop 29 disposed in superposed relation to cell 1. First branch 27 serially includes cryotron gate 30 disposed such that side 2 of cell 1 has a cryotron grid action with respect thereto and similarly, second branch 28 includes a cryotron gate 31 operatively associated with side 3 of cell 1, the latter acting as a cryotron grid with respect to gate 31. A cryotron gate 10 is also included in branch 28 and may be physically combined with gate 31 (as shown in FIG. 4) for saving space. Comparison bit selection conductor 11 is disposed across gate 10 in cryotron grid relation.

A cryotron gate 32 is disposed in superposed gate relation with branch 28 so that branch 28 acts as a cryotron grid to render gate 32 resistive thereby to sense current in branch 28; gate 32 is serially included in a column sense conductor 33.

In operation, the embodiment of FIG. 3 has information entered therein in the same manner as the FIG. 1 apparatus. Assume a "one" bit is stored in cell 1 as a clockwise current. Now assume another "one" is presented on column conductor 4 as a downwards current. This additional current will add to the clockwise current in side 3 and subtract therefrom in side 2. Coincident with the interrogating "one" current presented on column conductor 4, a comparison bit selection current is presented on line 11 and a compare current is applied on line 25. The line 25 current will flow through cryotron gate 30 and branch 27 since the grid current overlying cryotron 30 in side 2 of cell 1 is substantially zero, while cryotron gate 10 and therefore branch 28 is rendered resistive by cryotron grid current and comparison bit selection line 11.

Assume application of a binary zero interrogation on column conductor 4, the binary zero consisting of an upwards current therein. The upwards current in conductor 4 will divide in sides 2 and 3, adding to the clockwise current in side 2 and subtracting therefrom in side 3. Now cryotron 30 is also rendered resistive by the double current in side 2 and therefore no supercurrent flows in comparison line 25. Therefore the absence of a comparison is indicated.

In the event the particular memory location shown in FIG. 3 is not selected for comparison by a current on comparison bit selection line 11, line current will be permitted on line 25 in any case. That is comparison line 25 current will be permitted to flow either in the first branch 27 through cryotron 30 or through cryotron gate 31 in by-pass branch 28 as long as no disabling current appears on line 11. Therefore comparison line 25, which extends through a number of memory locations in a word row, will remain resistanceless as long as no discrepancy between interrogation and storage appears at any of the cell locations selected by comparison bit selector current 11. A mismatch, however, will render gate 30 resistive and therefore will introduce resistance in comparison line 25.

In some instances cryotron gate 31 may be eliminated without altering operation of the circuit, thus saving a cryotron. Alternatively it may be combined with cryotron 10. Cryotron gate 31 is desirably included (in combined fashion) to insure accurate but broad tolerance operation of the circuit. In the case of memory locations not selected by a current on comparison bit selection conductor 11, a binary zero, i.e. an upwards current, is usually applied to the corresponding column conductor 4. Then, either cryotron gate 30 or 31 will be rendered resistive, but not both, insuring a zero resistance path for the current in comparison line 25. Neither cryotron 30 nor 31 is then called upon to distinguish between half (stored) and full (interrogated) cell current.

For purposes of read out, an upwards current may be applied in column conductor 4 which will subtract from the stored current in either side 2 or 3, depending upon whether the stored bit is a binary zero or a binary one. Comparison line current is also applied. If the stored bit is a binary zero, comparison line current will flow in branch 27 through cryotron gate 30. If a binary one is stored, a comparison line current will flow in branch 28 over cryotron gate 32, causing the resistance thereof. The presence or absence of resistance, indicative then of a binary one or binary zero, is detected by applying a current on sense conductor 33. Many of the current conventions described herein are a matter of convenience, and may be reversed, if desired. For example, a downwards current on column conductor 4, coincident with a comparison line current and a sense current, could be employed whereupon presence of resistance in line 33 would indicate a stored zero rather than a stored one.

The circuit of FIG. 3 is seen to eliminate a loop circuit as compared with the FIG. 1 apparatus inasmuch as the same loop is used for both interrogation and read out. Also a current line is saved, i.e. the read line 18, since comparison line current is used for both interrogation and read out purposes. In addition to saving circuitry, while retaining a liberal safety factor in regard to tolerances, one cryotron may in effect be saved, i.e. cryotron 19 in FIG. 1. In a deposited cryotron circuit it is important to minimize the number of inactive cross-overs also. The circuit of FIG. 3 offers a substantial improvement in this regard, as well as in space utilization, reduction of memory wiring, and circuit tolerances.

The memory cell location illustrated in FIG. 3 is shown incorporated in a data addressed memory system as illustrated in FIG. 4, wherein like reference numerals refer to like elements with particular regard to the FIG. 3 memory location circuit. The apparatus illustrated in FIG. 4 is a data addressed type of memory wherein information presented on the column conductors A–A′, B–B′, and C–C′, is compared simultaneously with the contents of each row in the memory matrix. Each memory cell, 1, in the memory matrix is operated in the same manner as hereinbefore set out with reference to the circuit of FIG. 3. In addition to a multiplicity of memory cells 1 arranged in columns and rows, the memory also includes selection and control logic whose function it is to locate the first compatible row which agrees with an interrogation and to isolate that row so that read and write operations can be performed on that word only. Finally after the word has been processed, its row is by-passed during subsequent interrogations with a same interrogation word. These operations are performed by a sequencing ladder comprising side rails 34 and 35 as well as rungs 36, 37 and 38, by location switches comprising persistent current loops 39, **39*a* and 39*b*, and by sequence control loops 40, 40*a* and 40*b***.

The sequencing ladder selects the first word of the class being interrogated or searched, that is one stored nearest the "top" of the memory which compares favorably. For each row of the memory the sequencing ladder includes a cryotron gate 42 superposed in grid relation by comparison line 25 for that row. The ladder rung, e.g. rung 36, for the top row in the memory serially includes a cryotron gate 43 superposed in grid relation by a passive comparison line 44. The parallel combination of the comparison line 25 for each memory row and passive comparison line 44, is supplied a relatively constant "compare" current in series with such parallel combinations for other rows in the memory.

In the case of a row of the memory which compares with an interrogation presented on lines A–A′, B–B′, and C–C′, all comparison cryotrons 30 for that row will be left superconducting. Then a current will flow in comparison line 25 across cryotron gate 42 in the sequencing ladder. A current applied between ladder rails 34 and 35 will flow in rung 36, if cryotron gate 42 is resistive, and then back through rail 35. This current is applied substantially coincidentally with the application of interrogation currents on column conductors A–A′, B–B′, and C–C′, the application of current in selected comparison bit selection lines 11, and the application of a pulse on interrogate reset line 58 overlying cryotron gates 59 included in passive comparison lines 44. The application of pulse on interrogate reset line 58 tends to force "compare" current into the comparison line 25 for each row; such current will remain there if a favorable comparison with the interrogation for that row exists. Otherwise it will return to passive line 44 as the pulse on reset line 58 concludes, indicating a mismatch between an interrogation and the contents of a memory row. The current on line 44 then renders resistive rung cryotron 43 and cryotron gate 42 is left resistanceless; then current in rail 34 will flow farther down the sequencing ladder seeking a comparing row.

Assume a comparison is achieved in the top row; circulating persistent currents will now be set up in location switches with the exception of switch 39 in the top row, which row compared with the interrogation. This procedure is accomplished by applying a set location switch current on set location switch conductor 45, pulsing write location switch conductor 46 disposed across cryotron gate 47 on the left hand side of the location switch loop, followed by the removal of the set location switch current. This causes a persistent circulating current to flow in location switch loops **39*a* and 39*b* in the same manner as heretofore described with reference to loop 1. A persistent current is not set up in location switch loop 39 because a current in rung 36 of the sequencing ladder passes over cryotron gate 47 in grid relation and continues to render the loop resistive and therefore incapable of supporting a persistent current. Location switch 39 may then be described as "open," allowing access to the top row of the memory. The open location switch 39 allows passage of a write memory current on write memory conductor 6 for the top row inasmuch as cryotron gate 48, serially included in conductor 6 and underlying switch 39, remains superconducting. Likewise the open location switch allows passage of current in write sequence control conductor 49 because cryotron gate 50 serially included in conductor 49 likewise remains superconducting. It therefore follows that new information may be written in the top row of the memory and a circulating current may be written in sequence control loop 40**, as hereinafter more fully described. Moreover, the information contained in this row in the memory, which compared with the applied interrogation, may be read out in substantially instantaneous or in parallel fashion.

Comparison line 25 also includes a cryotron 51 underlying location switch 39. However, since no current is set up in location switch 39 for the top (or comparing) row of the memory, cryotron 51 does not become resistive and comparison line current continues to flow in line 25. Moreover, cryotron 51 is by-passed by a superconducting cryotron 52.

As may be noted, more than one row in the memory may have compared with an interrogation, the function of the sequencing ladder being the selection of the first or topmost row producing a comparison. For further comparing rows in the memory, the comparison line, e.g. line **25*a* in the second row, will also remain superconducting. The comparison line will remain superconducting after entrance of a circulating current in its location switch 39*a* because a by-pass cryotron, in this case 52*a*, allows comparison line current to pass cryotron 51*a*. It is now necessary for read-out purposes to pulse read-out-set line 53 rendering resistive cryotron gates 52, 52*a* and 52*b*** for the purpose of diverting current from comparison lines except comparison line 25 for the topmost comparing row. The compare and read current will then be forced into passive comparison lines 44*a* and 44*b* for the other rows and this current will remain in comparison line 25 only for the top row. This by-pass arrangement, then inhibited by a current in line 53, is included to avoid rendering cryotron 51 resistive when establishment of a circulating current is initially attempted in location switch 39.

Now the information in the top or comparing row is conveniently read out. Upwards currents are applied in column conductor A–A′, B–B′, and C–C′. At the same time, sense currents are applied in sense conductors D–D′, E–E′ and F–F′. Likewise compare current remains in line 25. Since comparison line current flows in line 25 only for the top row, cryotron gates 32 for the top row will be resistive or not depending upon the contents of the memory cells in the top row. The column conductor currents in combination with the cell currents force compare current into branch 28 for a binary one stored, rendering the corresponding gate 32 resistive. Gates 32 in the rest of the memory will all remain superconducting. The presence or absence of a voltage across D–D′, E–E′ and F–F′ will indicate the digits of the word contained in the top row of the memory matrix.

After the foregoing detection of the top row of the memory, as one which compared with an interrogation, it will be desired to "disable" this row from a further comparison with the same interrogation, for example, when it is desired to detect a second row comparing with a partial interrogation. To this end, a write sequence control pulse is applied on line 49 through the open location switch cryotron 50 and across cryotron gate 54 in sequence control loop 40. A set sequence control is concurrently applied on set sequence control line 55, joining the sequence control loops. After conclusion of the write sequence control pulse, the set sequence control current is also terminated, resulting in establishment of a circulating persistent current in loop 40 in the manner hereinbefore set out. This current in loop 40 overlies, in cryotron grid relation, cryotron gate 56 serially included in comparison line 25, forcing the compare current into passive comparison line 44. A further selection of the top row of the memory by employing the sequencing ladder is thus disabled. Passive comparison line 44 overlies, in cryotron grid relation, gate 43 disposed in the top rung 36, of the sequencing ladder. Ladder current must then seek a run for a second comparing row. Sequence control loops 40*a* and 40*b* do not have circulating persistent currents stored therein at this time inasmuch as no write sequence control currents reached sequence control loops 40*a* and 40*b* because of the inhibiting circulating currents in location switches 40 and 41.

The sequencing ladder can now select the next row in the memory which compares favorably with the same interrogation. After all rows comparing favorably with the same interrogation or partial interrogation have thus been non-destructively read out, re-application of the same interrogation and a current between ladder side rails 34 and 35 produces a voltage between side rails 34 and 35 indicating no further comparisons. Then erase sequence control line 57 overlying cryotron gates 54 is pulsed destroying the persistent currents in the sequence control loops.

Writing information in the memory may be conveniently accomplished by first filling empty memory rows with all zeros and then seeking a comparison with the first all-zero row by using an all-zero interrogation. All location switches are then actuated except for the one in comparing row in the manner hereinbefore set out and desired information is then written in the selected row.

It is understood interrogation, selection, reading and writing in other rows of the memory occur in the same manner herein set out with reference to the row described. It is also understood that the three row-three digit memory matrix is illustrative only and not to be taken in a limiting sense.

While we have shown and described several embodiments of our invention, it will be apparent to those skilled in the art that many changes and modifications may be made without departing from our invention in its broader aspects; and we therefore intend the appended claims to cover all such changes and modifications as fall within the true spirit and scope of our invention.

What we claim as new and desire to secure by Letters Patent of the United States is:

1. A superconducting memory matrix comprising a plurality of superconducting persistent current memory loops electrically arranged by columns and rows, each loop including a first side and a second side, each loop having coupling means for inserting a current into the loop, said coupling means comprising column conductors interconnecting columns of said loops, and each loop also having associated therewith second means in cryotron grid relation to said loop for quenching a current in a portion of the loop to establish persistent current in said loop upon the conclusion of said current inserted into said loop, a second loop associated with at least one of said memory loops, said second loop comprising a first branch and a second branch in parallel, conductor means for supplying current to said parallel branches, at least one of said branches of said second loop including gate means influenced in superposed grid relation by one side of said one of said memory loops, and cryotron gate means for detecting the branch of said second loop carrying a current for detecting the digit information stored in said one of said memory loops.

2. A superconducting memory matrix comprising a plurality of superconducting memory loops arranged by columns and rows, each loop including a first side and a second side, each loop having coupling means for inserting a current into the loop, said coupling means comprising column conductors interconnecting said loops by columns, each loop also having associated therewith second means in cryotron grid relation to the loop for quenching a current in a portion of said loop to establish persistent current in said loop upon the conclusion of said current inserted into said loop, a second loop associated with ones of said memory loops, said second loop comprising a first branch and a second branch in parallel, conductor means common to rows of said memory loops for supplying current to said parallel branches, at least one of said branches of said second loop including gate means influenced in superposed grid relation by one side of said one of said memory loops, cryotron gate means disposed in superposed relation with one branch of said second loop for detecting a current therein, and one of said branches serially including another cryotron gate means and a cryotron grid associated therewith so that a selected current in said grid forces current out of the associated branch of the second loop.

3. A superconducting memory matrix comprising a plurality of superconducting memory loops each including a first side and a second side, each including coupling means for inserting a current into the loop, each also having associated therewith second means in cryotron grid relation to the loop for quenching a current in a portion of said loop to establish persistent current in said loop upon the conclusion of said current inserted into said loop, a second loop associated with at least one of said memory loops, said second loop comprising a first branch and a second branch in parallel, conductor means for supplying current to said parallel branches, one of said branches including a cryotron gate superposed in cryotron grid relation by one side of said one of said memory loops, the other branch of said second loop including a cryotron gate superposed in grid relation by the other side of said one of said memory loops, cryotron gate means disposed in superposed relation with one branch of said second loop for detecting a current therein, and one of said branches serially including another cryotron gate means and a cryotron grid associated therewith so that a selected current in said grid forces current out of the associated branch of the second loop.

4. A superconducting memory matrix comprising a plurality of persistent current memory loop cells arranged in columns and rows, means for entering persistent currents into said memory cells wherein circulating current in a first direction is indicative of a binary digit, said means comprising column conductors interconnecting said memory cells and second means for quenching current in a portion of each said cell loop so that persistent current is established in selected cells upon the conclusion of current inserted into the loop by said column conductor, each cell having third cryotron gate means for detecting a current in said cell, connection means for presenting currents to said column conductors representative of information for storage in said matrix and later for presenting second currents to said column conductors representative of information for interrogation of said matrix which second currents add to persistent currents stored in said matrix to render resistive said third means, a pair of parallel superconducting branches associated with each cell one of which includes said third means, cryotron gate means influenced in its superconductivity by current in one of said branches for ascertaining current flow therein, and grid means associated in cryotron relation with one of said branches for the purpose of forcing current into the other said branches.

5. A superconducting memory matrix comprising a plurality of persistent current memory loop cells arranged in columns and rows, means for entering persistent currents into said memory cells wherein circulating current in a first direction is indicative of a binary digit, said means comprising column conductors interconnecting said memory cells and second means for quenching current in a portion of each said cell loop so that persistent current is established in the cell upon the conclusion of current inserted into said loop by a said column conductor, a pair of parallel superconducting branches associated with each cell, each serially including a cryogenic gate in each of said branches whose resistance is controlled by current in a separate portion of each said memory cell, cryotron gate read out means influenced in its superconductivity by current in one of said branches for ascertaining current flow therein, and grid means associated in cryotron relation with one of said branches for the purpose of forcing current into the other of said branches.

6. The apparatus as set forth in claim 4 wherein the grid means associated in cryotron relation with one of said branches crosses one said cryogenic gate in one of said branches in cryotron relation thereto whereby said cryogenic gate serves a dual purpose.

References Cited by the Examiner

UNITED STATES PATENTS

| | | | |
|---|---|---|---|
| 3,019,349 | 1/62 | Sanborn | 340—173.1 |
| 3,019,354 | 1/62 | Anderson | 340—173 X |

OTHER REFERENCES

IBM Technical Disclosure Bulletin, vol. 3, No. 10, March 1961, Associative Memory, R. F. Rosin.

Electro-Technology, Superconductive Circuits for Computing Machines, Newhouse, pages 78–89, April 3, 1961.

Electronics, Nov. 24, 1961, Superconductive Computers, Maguire, pages 45–51.

IRVING L. SRAGOW, *Primary Examiner.*